United States Patent [19]
Dany et al.

[11] 4,210,630
[45] Jul. 1, 1980

[54] STABILIZED RED PHOSPHORUS

[75] Inventors: Franz-Josef Dany; Ursus Thümmler, both of Erftstadt; Joachim Wortmann, Kerpen-Türnich; Horst Staendeke; Joachim Kandler, both of Erftstadt, all of Fed. Rep. of Germany

[73] Assignee: Hoechst Aktiengesellschaft, Fed. Rep. of Germany

[21] Appl. No.: 22,446

[22] Filed: Mar. 21, 1979

[30] Foreign Application Priority Data

Mar. 25, 1978 [DE] Fed. Rep. of Germany ....... 2813151

[51] Int. Cl.² .......................................... C01B 25/023
[52] U.S. Cl. ..................................... 423/265; 423/322; 252/400 A
[58] Field of Search ............... 423/265, 267, 274, 322; 252/381, 397, 400 A

[56] References Cited

U.S. PATENT DOCUMENTS

| 2,559,684 | 7/1951 | Skolnik et al. | 423/322 |
| 2,645,571 | 7/1953 | Silverstein | 423/322 |
| 2,664,344 | 12/1953 | Nordblom et al. | 423/322 |
| 4,113,841 | 9/1978 | Staendeke et al. | 423/265 |
| 4,115,522 | 9/1978 | Staendeke et al. | 423/265 |

*Primary Examiner*—O. R. Vertiz
*Assistant Examiner*—Thomas W. Roy
*Attorney, Agent, or Firm*—Connolly and Hutz

[57] ABSTRACT

The invention provides stabilized pulverulent red phosphorus comprising a homogeneous blend of red phosphorus particles with a size of at most about 2 mm, aluminum hydroxide and a further metal hydroxide as oxidation stabilizers, wherein the metal hydroxide is lead hydroxide. The homogeneous blend contains aluminum hydroxide and lead hydroxide in a total proportion of about 0.1 to 6 weight %, based on the quantity of red phosphorus, the aluminum hydroxide and lead hydroxide, calculated as $Al_2O_3$ to PbO, being used in a quantitative ratio of about 0.5 to 2.0.

4 Claims, No Drawings

STABILIZED RED PHOSPHORUS

This invention relates to red phosphorus which is stabilized by subjecting an aqueous suspension of red phosphorus to treatment with a blend of aluminum hydroxide and a further metal hydroxide, the blend being precipitated on the phosphorus suspension.

It has been described that red phosphorus in moist atmosphere undergoes a chemical surface reaction involving oxidation and disproportionation with the resultant formation of various acids of phosphorus (oxidation stages +1 to +5) and hydrogen phosphide.

As described by Gmelin, Handbuch der anorganischen Chemie, 8th edition (1964), vol. phosphorus, part B, page 83, Verlag Chemie, Weinheim (Bergstrasse), red phosphorus can be stabilized by means of aluminum hydroxide which is precipitated on the phosphorus particles by the consecutive addition of aqueous 10% sodium hydrogen carbonate and aluminum sulfate solutions heated to 55°-60° C. The resulting aqueous suspension is filtered and the filter residue is dried. While red phosphorus which is so stabilized is widely applicable, the fact remains that the process just described is not fully satisfactory in respect of the following points:

By precipitating aluminum hydroxide on the suspension the latter is given a slimy consistency whereby filtration is rendered difficult. In addition to this, aluminum hydroxide has a high power for retaining water so that the resulting filter cake inevitably contains considerable proportions of residual water which adversely affects the drying both as regards energy and drying period.

A further process for stabilizing red phosphorus has been disclosed in U.S. Pat. No. 2,635,953, wherein aluminum hydroxide is used in admixture with zinc or magnesium hydroxide. These hydroxides are also not fully satisfactory. Adverse affects ancountered therewith reside either in the poor filterability of the phosphorus-containing suspension or in an unsatisfactory stability of the red phosphorus which is treated therewith.

Still further processes for stabilizing red phosphorus have been disclosed in German Patent Specifications "Offenlegungsschriften" Nos. 2 622 296 and 2 632 296, wherein salts of acid orthophosphoric acid esters or phosphonic acids are precipitated on red phosphorus, the cations in these compounds being elements belonging to groups 2 and 3 of the periodic system. Red phosphorus stabilized therewith is indeed extremely stable to oxidation, but these stabilizers are highly expensive as compared with those which are based on aluminum hydroxide.

In accordance with our present invention we have found that red phosphorus which is stabilized with a mixture of aluminum hydroxide and lead hydroxide is unexpectedly free from the adverse effects described hereinabove. The present invention relates more particularly to stabilized pulverulent red phosphorus comprising a homogeneous blend of red phosphorus particles with a size of at most about 2 mm, aluminum hydroxide and a further metal hydroxide as oxidation stabilizers, wherein the metal hydroxide is lead hydroxide, the homogeneous blend containing aluminum hydroxide and lead hydroxide in a total proportion of about 0.1 to 6 weight%, based on the quantity of red phosphorus, and the aluminum hydroxide and lead hydroxide, calculated as $Al_2O_3$ to PbO, being used in a quantitative ratio of about 0.5 to 2.0.

The red phosphorus should preferably be used in the form of particles with a size of about 0.01 to 0.15 mm. Further preferred features provide for the homogeneous blend to contain aluminum hydroxide and lead hydroxide in a total proportion of 0.4 to 2.0 weight%, based on the quantity of red phosphorus, and for the metal hydroxides, calculated as $Al_2O_3$ to PbO, to be used in a quantitative ratio of 0.7 to 1.3.

Red phosphorus can, for example, be stabilized as follows, in accordance with this invention: An aqueous suspension of red phosphorus is first admixed while stirring with aqueous solutions containing the necessary proportions of aluminum salt and lead salt, respectively, and then with sodium hydroxide solution to cause precipitation of aluminum hydroxide and lead hydroxide. Next, the suspension is stirred for 1 hour at 80° C., filtered and the filter residue is dried at 110° C. in contact with nitrogen.

During the preparation of stabilized red phosphorus it has turned out that the aqueous suspension of red phosphorus with the precipitated hydroxides therein can be filtered considerably more rapidly than a suspension which is free from lead hydroxide. Needless to say such good filterability is highly desirable. In addition to this, it has unexpectedly been found that the stabilizing efficiency of aluminum hydroxide, relative to the undesirable evolution of phosphine during storage of red phosphorus in a moist atmosphere, can be considerably improved through the use of lead hydroxide as a costabilizer, which itself has no power for stabilizing red phosphorus.

It is known in the art that copper compounds, e.g. copper hydroxide or copper oxide, permit the above evolution of phosphine to be suppressed practically completely. On the other hand, they are known considerably to accelerate the oxidation of red phosphorus. In other words, red phosphorus which is stabilized with copper compounds is liable very soon to assume a pasty or liquid consistency under the action of air.

Red phosphorus stabilized in accordance with this invention has an oxidation stability which at least equals that of red phosphorus stabilized with aluminum hydroxide. Also considerably less phosphine is liable to be evolved than by red phosphorus stabilized with aluminum hydroxide alone. Needless to say it is very important to have stabilized red phosphorus of which the tendency to evolve phosphine is reduced. As it is known, phosphine is highly injurious to health even in minor concentrations. It should also be borne in mind that self-ignitable diphosphane or polyphosphanes which are liable to cause fire-outbreaks or undergo explosions always accompany phosphine.

The following Examples describe the extent to which aqueous suspension of red phosphorus can be stabilized with the use of magnesium hydroxide, aluminum hydroxide, copper hydroxide or lead hydroxide and suitable mixtures thereof. The results obtained are indicated in the Table hereinafter in which the quantity of hydroxide, calculated as oxide, precipitated on red phosphorus is indicated in columns 2 through 5, and the quantity of phosphoric acid ($H_3PO_4$) evolved under defined conditions is indicated in columns 6 and 7. Specified in column 8 is the time which was necessary for filtering the respective batch and indicated in column 9 is the water content of the respective filter cake.

EXAMPLE 1 (Comparative Example)

A 25 l stainless steel reactor was fed with 6 kg of red phosphorus particles with a size of 5 to 100 microns and 9 l of water. The material placed in the reactor was continually stirred and admixed with a 30 weight% aqueous solution of 181.5 g of $MgCl_2.6H_2O$, corresponding to 0.6 part by weight of MgO per 100 parts by weight of P. Next, a 20 weight% aqueous solution of sodium hydroxide was added dropwise for as long as necessary to establish a pH of 9 in the suspension.

The suspension was stirred for a further 1 hour at 80° C. and filtered. It was filtered with the aid of a laboratory rotating vacuum filter with the following technical data:
Diameter of drum=31 cm; breadth of filtration area=11 cm; 0.7 rpm. The time which was needed for filtration and the water content of the filter cake were determined. The filter cake was dried within 15 hours at 110° C. under nitrogen.

EXAMPLE 2 (Comparative Example)

The procedure was as in Example 1, but the magnesium chloride was replaced by a 40 weight% aqueous solution of 235.3 g of $Al_2(SO_4)_3.18H_2O$, corresponding to 0.6 part by weight of $Al_2O_3$ per 100 parts by weight of P.

EXAMPLE 3 (Comparative Example)

The procedure was as in Example 1, but the magnesium chloride was replaced by a 20 weight% aqueous solution of 153.5 g of $CuSO_4.5H_2O$, corresponding to 0.815 part by weight of CuO per 100 parts by weight of P.

EXAMPLE 4 (Comparative Example)

The procedure was as in Example 1, but the magnesium chloride was replaced by a 40 weight% aqueous solution of 94.3 g of $Pb(CH_3-COO)_2.3H_2O$, corresponding to 0.925 part by weight of PbO per 100 parts by weight of P.

EXAMPLE 5 (Comparative Example)

The procedure was as in Example 1, but the $MgCl_2.6H_2O$ was used in combination with a 20 weight% aqueous solution of 153.5 g $CuSO_4.5H_2O$, corresponding to 0.815 part by weight of CuO per 100 parts by weight of P.

EXAMPLE 6 (Comparative Example)

The procedure was as in Example 1, but the $MgCl_2.6H_2O$ was used in combination with a 40 weight% aqueous solution of 94.3 g of $Pb(CH_3-COO)_2.3H_2O$, corresponding to 0.925 part by weight of PbO per 100 parts by weight of P.

EXAMPLE 7 (Comparative Example)

The procedure was as in Example 1, but the magnesium chloride was replaced by a 40 weight% aqueous solution of 235.3 g of $Al_2(SO_4)_3.18H_2O$ and a 20 weight% aqueous solution of 153.5 g of $CuSO_4.5H_2O$, corresponding to 0.815 part by weight of CuO and 0.6 part by weight of $Al_2O_3$ per 100 parts by weight of P.

EXAMPLE 8 (Invention)

The procedure was as in Example 1, but the magnesium chloride was replaced in each particular case by a 40 weight% aqueous solution of Al- and Pb-salts, namely by:

(a) 235 g of $Al_2(SO_4)_3.18H_2O$ and 94.3 g of $Pb(CH_3-COO)_2.3H_2O$, corresponding to 0.6 part by weight of $Al_2O_3$ and 0.925 part by weight of PbO per 100 parts by weight of P;

(b) 784.4 g of $Al_2(SO_4)_3.18H_2O$ and 188.7 g of $Pb(CH_3-COO)_2.3H_2O$, corresponding to 1.85 parts by weight of PbO and 2.0 parts by weight of $Al_2O_3$ per 100 parts by weight of P; and (c) 1568.7 g of $Al_2(SO_4)_3.18H_2O$ and 377.3 g of $Pb(CH_3-COO)_2.3H_2O$, corresponding to 4.0 parts by weight of $Al_2O_3$ and 3.7 parts by weight of PbO per 100 parts by weight of P.

The red phosphorus was tested for its stability to oxidation by a modified process Indian Standard "Specification for red phosphorus" IS: 2012-1961.

This process is described as follows:

(a) Conditioning of specimens

In each particular case, a 25 g specimen of stabilized red phosphorus was regularly distributed on a watch glass. The respective watch glasses were placed in a dessicator and stored therein over a period of 28 days at 50° C. over a saturated aqueous ammonium sulfate solution, corresponding to a relative atmospheric moisture of 72%. During that period, the dessicator was in a drying cabinet which was maintained at 50° C.

(b) Determination of phosphine

To determine the phosphine $PH_3$ which was evolved, the gas volume in the dessicator was displaced with the aid of nitrogen and delivered to two series-connected gas wash bottles which were filled with a 5 weight% solution of mercury-II-chloride, in which the phosphine underwent reaction to give insoluble $P(HgCl)_3$. This was oxidized with iodine in accordance with the following equation:

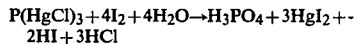

$$P(HgCl)_3 + 4I_2 + 4H_2O \rightarrow H_3PO_4 + 3HgI_2 + 2HI + 3HCl$$

The excess of iodine was determined by titration with a solution of sodium thiophosphate. 1 ml of consumed 0.1 N iodine solution corresponded to 0.425 mg of $PH_3$ (process described by Beyer, Handbuch, Analytische Chemie, part III, volume Va, page 353; Springer Verlag).

(c) Determination of rate of oxidation (acidity)

5 g of conditioned red phosphorus was suspended in 100 ml of $H_2O$ and the suspension was heated to boiling. The phosphorus was filtered off and washed several times with hot water. The filtrate was admixed with 15 g of NaCl and titrated against phenolphthalein with a 0.1 N sodium hydroxide solution. 1 ml of 0.1 N-NaOH corresponded to 4.9 mg of $H_3PO_4$. The values determined for $PH_3$ and $H_3PO_4$ in the manner described above were converted to 1 g of red phosphorus used.

The following Table shows that red phosphorus which is stabilized with the stabilizer mixture of the present invention compares favorably as regards evolution of phosphine with red phosphorus stabilized with a known stabilizer or stabilizer mixture other than a copper-containing stabilizer.

As indicated above, copper-containing compounds should conveniently not be used as stabilizers inasmuch as they promote the oxidation of red phosphorus in contact with air to such an extent that the phosphorus is liable to assume a delisquescent consistency.

As regards stability to oxidation, the stabilizer mixture of the present invention has been found to produce results which at least equal those obtained with the use of aluminum hydroxide alone, and which considerably excel those obtained with the use of conventional hydroxides or mixtures thereof.

Last but not least, the present stabilizer mixture permits the phosphorus filter cake to be critically improved in respect of filtration period and water-content.

6 weight%, based on the quantity of red phosphorus, the aluminum hydroxide and lead hydroxide, calculated as $Al_2O_3$ to PbO, being used in a quantitative ratio of about 0.5 to 2.0.

2. Red phosphorus as claimed in claim 1, wherein the particles have a size within the range about 0.01 to 0.15 mm.

TABLE

| Example | MgO | $Al_2O_3$ | CuO (g/100 g P) | PbO | $H_3PO_4$ (mg/g P) | $PH_3$ | Filtration period (min) | $H_2O$-content (wt %) |
|---|---|---|---|---|---|---|---|---|
| 1 | 0.6 | — | — | — | 107.6 | 0.73 | 55 | 17.7 |
| 2 | — | 0.6 | — | — | 66.3 | 0.18 | <70 | 22.1 |
| 3 | — | — | 0.815 | — | 220.4 | 0.04 | 58 | 18.8 |
| 4 | — | — | — | 0.925 | 122.5 | 1.34 | 51 | 17.0 |
| 5 | 0.6 | — | 0.815 | — | 154.3 | 0.03 | 54 | 19.1 |
| 6 | 0.6 | — | — | 0.925 | 110.7 | 0.77 | 50 | 17.8 |
| 7 | — | 0.6 | 0.815 | — | 159.9 | 0.01 | <70 | 22.3 |
| 8a) | — | 0.6 | — | 0.925 | 63.4 | 0.08 | 15 | 14.4 |
| 8b) | — | 2.0 | — | 1.850 | 57.1 | 0.05 | 19 | 16.8 |
| 8c) | — | 4.0 | — | 3.700 | 52.4 | 0.05 | 30 | 17.9 |

We claim:

1. Stabilized pulverulent red phosphorus comprising a homogeneous blend of red phosphorus particles with a size of at most about 2 mm, aluminum hydroxide and a further metal hydroxide as oxidation stabilizers, wherein the metal hydroxide is lead hydroxide, the homogeneous blend containing aluminum hydroxide and lead hydroxide in a total proportion of about 0.1 to 6 weight%, based on the quantity of red phosphorus, the aluminum hydroxide and lead hydroxide, calculated as $Al_2O_3$ to PbO, being used in a quantitative ratio of about 0.5 to 2.0.

3. Red phosphorus as claimed in claim 1, wherein the homogeneous blend contains aluminium hydroxide and lead hydroxide in a total proportion of 0.4 to 2.0 weight%, based on the quantity of phosphorus.

4. Red phosphorus as claimed in claim 1, containing aluminum hydroxide and lead hydroxide, calculated as $Al_2O_3$ to PbO, in a quantitative ratio of 0.7 to 1.3.

* * * * *